United States Patent
Arnold (10) Patent No.: US 6,783,194 B2
(45) Date of Patent: Aug. 31, 2004

(54) METHOD AND BRAKE SYSTEM FOR CONTROLLING THE BRAKING PROCESS IN A MOTOR VEHICLE

(75) Inventor: Armin Arnold, Pyrbaum (DE)

(73) Assignee: Pacifica Group Technologies Pty. Ltd., East Bentleigh (AU)

( * ) Notice: Subject to any disclaimer, the term of this patent is extended or adjusted under 35 U.S.C. 154(b) by 0 days.

(21) Appl. No.: 10/345,721

(22) Filed: Jan. 16, 2003

(65) Prior Publication Data

US 2003/0107265 A1 Jun. 12, 2003

Related U.S. Application Data (63) Continuation of application No. PCT/DE01/02475, filed on Jul. 18, 2000.

(51) Int. Cl.⁷ .................................................. B60T 8/24
(52) U.S. Cl. ........................................ 303/139; 303/163
(58) Field of Search ................................ 303/139, 140, 303/146, 150, 151, 163, 167; 701/70, 71

(56) References Cited

U.S. PATENT DOCUMENTS

| | | | |
|---|---|---|---|
| 4,606,586 A | 8/1986 | Eckert et al. ................. | 303/93 |
| 5,711,025 A * | 1/1998 | Eckert et al. ................. | 701/83 |
| 6,367,894 B1 * | 4/2002 | Mergenthaler ............... | 303/192 |

FOREIGN PATENT DOCUMENTS

| | | | |
|---|---|---|---|
| DE | 3840456 A1 | 6/1990 | |
| DE | 4034814 A1 | 5/1992 | ............. B60T/8/32 |
| DE | 3226074 A1 | 9/1993 | ............. B60T/8/02 |
| DE | 4229560 A1 | 3/1994 | ........... B60K/28/16 |
| DE | 4305155 A1 | 8/1994 | ............. B60T/8/32 |
| DE | 198 13 194 C2 | 3/2000 | ............. B60T/8/32 |
| DE | 199 26 672 A1 | 3/2000 | ............. B60T/8/32 |
| EP | 0 644 836 B1 | 3/1994 | ............. B60T/8/00 |
| GB | 1 314 294 | 7/1971 | ............. B60T/8/08 |

* cited by examiner

*Primary Examiner*—Robert A. Siconolfi
*Assistant Examiner*—Melanie Torres
(74) *Attorney, Agent, or Firm*—Laurence A. Greenberg; Werner H. Stemer; Gregory L. Mayback (57) ABSTRACT

A wheelslip is calculated from wheel speed, recorded by speed sensors (6), by a controller (8). A pre-set value for the wheelslip is regulated by means of a proportional controller. Parallel thereto, a set brake pressure for the wheel brakes (3) is fixed, which is determined by the controller (8), by means of the instantaneous wheel torque (Mmomentan) transferred to the ground by the particular wheel (2).

17 Claims, 5 Drawing Sheets

METHOD AND BRAKE SYSTEM FOR CONTROLLING THE BRAKING PROCESS IN A MOTOR VEHICLE

CROSS REFERENCE TO RELATED APPLICATION

This application is a continuation of copending International Application No. PCT/DE01/02475 filed Jul. 18, 2000, which designates the United States.

BACKGROUND OF THE INVENTION

The invention relates to a method for controlling the braking process in a motor vehicle and a brake system which operates according to such a method. In such a method, brake actuation signals are converted into wheel brake pressures, the wheel speeds of at least some of the wheels are transmitted to a control system, the control system calculates a wheel slip from the wheel speeds and sets a predefined value for the wheel slip. The brake actuation signals are generated either by activation operations of the brake pedal by the driver or by a control system for controlling the vehicle dynamics or driving stability.

Known anti-lock brake systems (for example EP 0 644 836 B1) control the brake pressure of the individual wheels of a motor vehicle in such a way that the wheels are prevented from locking during braking and the steering capability of the motor vehicle is thus maintained by adapting the wheel brake pressure to the respective adhesion of the tire to the road pavement. This adaptation is carried out in that, when unacceptably high slip occurs, the brake pressure acting on the individual wheels is decreased intermittently—and thus discontinuously—and increased again using brake pressure control valves.

A more recent development is electromotively activated brake systems—referred to as EMB systems—which improve the safety and the comfort of the operation of motor vehicles and which are suitable in particular for use in systems for controlling the dynamics and stability of vehicles, traction controls, "intelligent" travel speed controllers etc. (see for example DE 198 13 194 C2). Such brake systems also greatly reduce or entirely eliminate the considerable expenditure on master brake cylinders, brake pressure lines etc. of conventional brake systems.

A method is known for controlling the slip of a wheel of a vehicle which determines a slip actual value and a first manipulated variable in accordance with a comparison between the slip actual value and a slip setpoint value in order to apply a brake pressure to the wheel, the first manipulated variable also being determined in accordance with the timing characteristics of the speed of one or more wheels of the vehicle (DE 199 26 672 A1). In order to condition an actuation variable for actuating a valve, the method determines a minimum actuation variable, compares an actuation variable determined by a controller with the minimum actuation variable and adjusts the actuation variable using earlier and/or later actuation variables to form a new actuation variable if the actuation variable is smaller than the minimum actuation variable.

An anti-lock brake system for a vehicle wheel is also known in which the wheel speed and the brake pressure are determined and slip actual values are formed using a reference speed and are used to control the brake pressure at the wheel brake (DE 40 34 814 A1). Here, the adjustment phases and brake pressure control phases alternate with one another, and during the adjustment phases the coefficient of friction is continuously determined from the brake pressure and the deceleration of the wheel. In these phases, in each case the maximum value of the coefficient of friction and in addition the slip value are determined when the maximum coefficient of friction is reached. In each case a somewhat smaller setpoint slip value is formed from the slip value and in the following adjustment phase it is fed to a slip controller as a setpoint slip value. When the wheel slip grows, the system is switched over during the adjustment phases beyond a predefined value to a brake pressure control mode during which a reduced brake pressure is set. After the slip drops below the value, an increased brake pressure is set and the slip controller is activated with the new setpoint slip if the slip is smaller than a limiting value.

A system which controls vehicle dynamics which is also known has a subordinate vehicle dynamics computer downstream of which a brake controller is connected (DE 43 05 155 A1). The latter has a channel for adjusting the yaw rate to a setpoint value and a channel for limiting the floating angle. The computer predefines the setpoint value and the limiting value and determines soft channel is effective on the basis of the driving situation. Both channels generate an adjustment signal which is conducted via a control amplifier with proportional and derivative component. An activation signal which is used to control the brake pressure at the wheel brakes is formed from the signal components which are produced, the instantaneous driving situation being categorized in one of a plurality of classes in both cases and this categorization also being used to define the wheels at which the brake pressure is controlled.

In particular within the framework of a vehicle dynamics control system it is desired to adjust a wheel to a predefined longitudinal slip value. The latter can of course also lie beyond the adhesion maximum of the tire, that is to say in the unstable region of the static friction curve or $\mu$ curve, in order thus to significantly reduce the lateral guidance of the wheel. Conventional PID controllers which are used in known ABS systems can cause difficulties in an electromotively activated brakes, particularly beyond the adhesion maximum.

SUMMARY OF THE INVENTION

The invention is based on the object of providing a brake control method and a brake system which permits satisfactory control of motor vehicle wheels to predefined longitudinal slip values, such as are desirable for example in a vehicle dynamics control system, even in EMB systems. This object can be, for example, achieved according to the invention by a method for controlling the braking process in a motor vehicle, comprising the steps of:

converting brake actuation signals into brake application forces, transmitting the wheel speeds of at least some of the wheels to a control system, calculating a wheel slip by the control system from the wheel speeds, and setting a predefined value for the wheel slip, setting the predefined value for the wheel slip by a proportional control and a setpoint brake pressure which is defined in parallel therewith.

Another method for controlling the braking process in a motor vehicle according to the present invention, comprises the steps of:

brake actuation signals are converted into brake application forces, the wheel speeds of at least some of the wheels are transmitted to a control system, a wheel slip is calculated by the control system from the wheel speeds, and a predefined value is set for the wheel slip, the predefined value for the wheel slip is set by a proportional control and a setpoint brake pressure which is defined in parallel therewith, and by setting the control to a longitudinal slip above the maximum of the coefficient of static friction, the lateral guiding force of the wheel is reduced, and the driving behavior of the motor vehicle is thus stabilized.

The predefined value for the wheel slip can be set by means of a proportional plus derivative control. The predefined value for the wheel slip can also be set by means of a proportional integral control with a very small integral component. The setpoint brake pressure can be determined by means of the wheel torque which is transmitted from the wheel to the underlying surface instantaneously. The wheel torque which can be transmitted from the wheel to the underlying surface instantaneously is determined from the torque balance at the wheel. The wheel torque which is transmitted from the wheel to the underlying surface instantaneously can be determined according to the equation $M_{inst.} = -M_{brake} + \omega \cdot \Theta$, wherein $M_{brake}$ is the brake torque caused by the brake, $\omega$ is the wheel acceleration values and $\Theta$ is the wheel inertia values, and in that the defined setpoint brake pressure with which intervention into the brake control system is carried out is calculated using a wheel brake pressure which corresponds to this transmitted wheel torque.

An embodiment according to the present invention can be a brake system with control of the braking process in a motor vehicle, comprising:

wheel speed sensors which sense the speeds of the wheels of the motor vehicle and transmit them to a control system, a control system which evaluates the sensor signals, calculates slip values of the individual wheels from the wheel speeds and generates control signals for the wheel brakes, and which contains a controller which is embodied as a proportional controller and which controls a predefined value for the wheel slip, a setpoint brake pressure being determined by the control system and said setpoint brake pressure being used, in addition to the adjustment, to set the brake pressure at the wheel brakes, and having brake actuators which convert the control signals into activation operations of the wheel brakes, wherein the control system sets the control to a longitudinal slip lying above the maximum of the coefficient of static friction and as a result reduces the lateral guiding force of the wheel and stabilizes the driving behavior of the motor vehicle.

The setpoint brake pressure can be determined by the control system by means of the wheel torque which is transmitted from the respective wheel to the underlying surface instantaneously The wheel torque which is transmitted from the respective wheel to the underlying surface instantaneously can be determined by the control system from the torque balance at the wheel. The predefined value for the wheel slip is set by a proportional controller and a setpoint brake pressure which is defined in parallel thereto (additionally).

The advantages of the invention are in particular the low level of expenditure which is necessary for its practical application. In addition, it has become apparent that even anti-lock brake systems can be significantly improved using the invention.

BRIEF DESCRIPTION OF THE DRAWINGS

Exemplary embodiments of the invention are explained in the text below with reference to the drawing, in which.

DETAILED DESCRIPTION OF THE PREFERRED EMBODIMENTS

A brake system 1 (FIG. 1) for a motor vehicle MV with four wheels 2 includes four brakes 3 which each have a brake disk 4 and an activation device in the form of a wheel brake actuator 5, also referred to below as actuator. The actuators 5 are each attached to an associated brake caliper 6. They each contain a pressure sensor (not illustrated). In each case a wheel speed sensor 7 is arranged in the vicinity of the brake disk 4 which is rigidly connected to the wheel 2.

Figure 1:
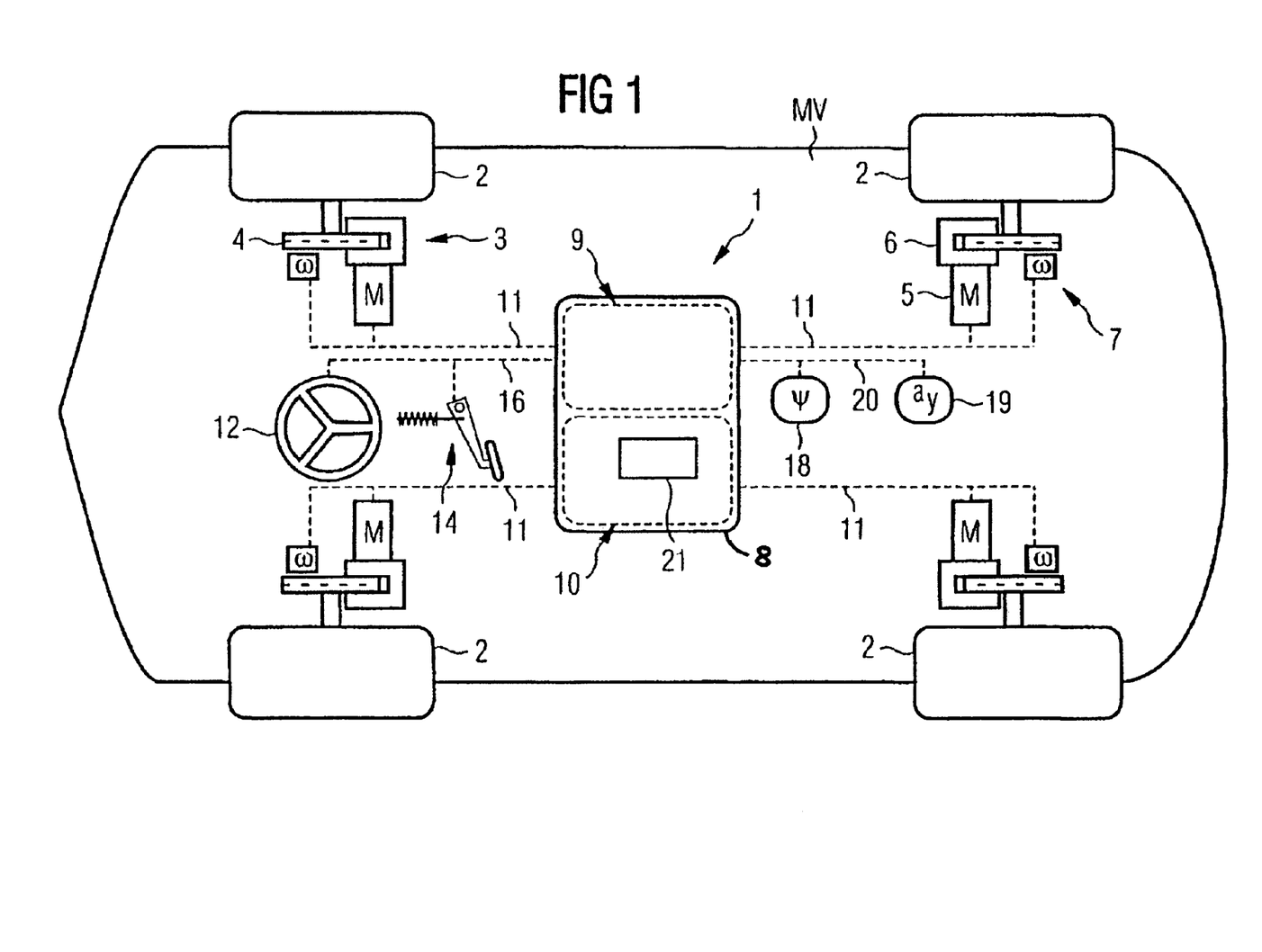
FIG. 1 shows an electric brake system according to the invention.

A central electronic control system 8 contains a first computer 9 which controls the basic brake function, and a second computer 10 which controls supplementary brake functions such as ABS, vehicle dynamics control etc. The control system 8 is connected to the aforesaid sensors and actuators by means of signal and control lines 11 which are indicated in the drawing by a dashed line.

A steering wheel 12 has a steering angle sensor whose signals are transmitted to the control system 8 via signal lines 16. A brake pedal 14 has one or more sensors, for example displacement sensors and pressure sensors, which are also connected to the control system 8 by means of one of the signal lines 16. These sensors are not illustrated as they are generally known and would make the drawing unclear.

Finally, the motor vehicle MV is provided with a yaw rate sensor 18 and a lateral acceleration sensor 19 which are connected to the control system 8 via signal lines 20. These last two sensors may be dispensed with if the invention is applied only in an ABS system.

The control system 8 evaluates the signals received via the signal lines 11, 16 and 20 and, in response, generates control signals, in a way to be described below, for each individual brake of the brakes 3 of the motor vehicle MV.

Figure 2:
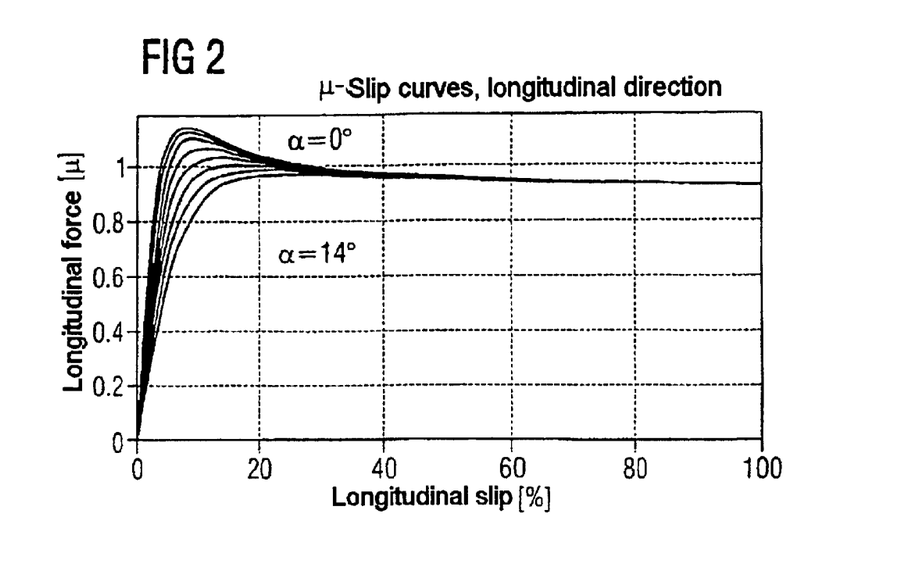
FIG. 2 shows the profile of the coefficient of static friction of a motor vehicle wheel on a road pavement in the longitudinal direction as a function of the longitudinal slip.

FIG. 2 illustrates the typical behavior of a motor vehicle tire on a road transmitted by means of friction between the tire and the road pavement in the longitudinal direction or driving direction, as a function of the longitudinal slip, specifically for various oblique running angles $\alpha=0°$, $2°$, $4°, \ldots, 14°$. $\mu$ is known to designate the coefficient of static friction between the wheel and the road pavement.

The illustrated curves show a maximum of approximately 10% slip which is manifest in accordance with the oblique running angle of the tire. If this maximum is exceeded owing to strong braking, the tire is operated on the unstable side of the μ slip curve and the wheel locks (if there is no immediate reduction in brake pressure). A customary ABS system would try to utilize the maximum as far as possible.

Figure 3:
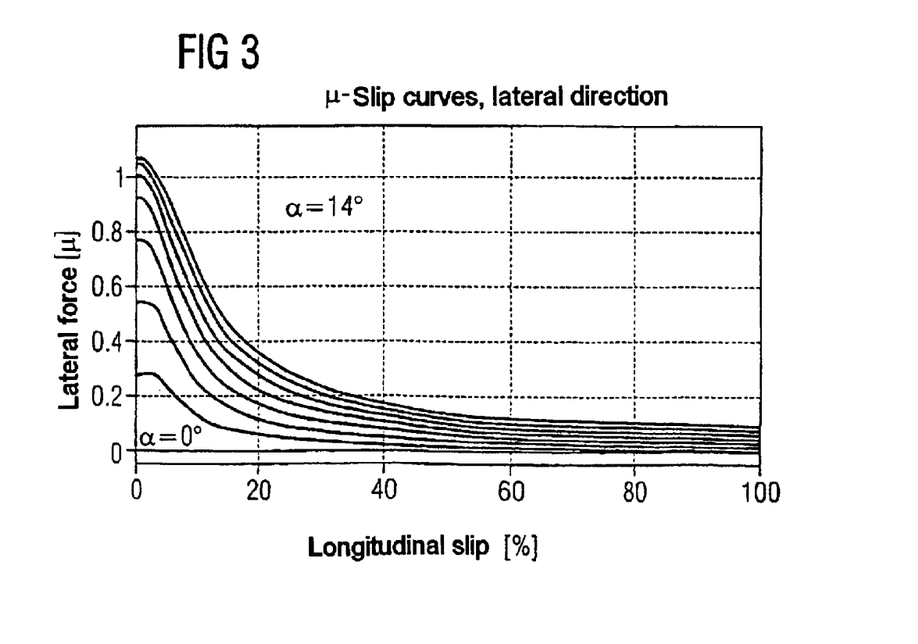
FIG. 3 shows the profile of the coefficient of static friction of a motor vehicle wheel on a road pavement in the transverse direction as a function of the wheel slip.

However, if the driving behavior is also to be influenced, as is necessary for example in a system for controlling vehicle dynamics, to prevent a motor vehicle from skidding or breaking away, the lateral guiding force can be selectively reduced by setting an even larger longitudinal slip. This is apparent from FIG. 3. However, to be able to influence the driving behavior in this way, a brake pressure control or braking force control which operates reliably in this slip region is necessary. Expressions such as brake pressure and braking force, brake application force and the like are equivalent within the framework of the invention as their values on a wheel brake differ only by a constant factor.

A controller 21 which is contained in the computer 10, and thus the control behavior according to the invention, has a proportional component (i.e. the controller 21 is embodied as a proportional controller) and optionally also a derivative component (the controller 21 is also a derivative controller). Integration of the control error, such as takes place in a conventional integral controller is dispensed with here. Instead of dispensing with it completely, a very low integral component can also optionally be retained. By dispensing with the integral component in this way, the control stability is increased as an integral component which is phase-delayed by π/2 with respect to the control error is not present.

The absence of the integral component would give rise to an unacceptably high steady-state control error if no further measures were taken. For this reason, a setpoint pressure request, which is determined taking into account the torque $M_{inst.}$ which is instantaneously transmitted from the wheel to the surface of the road pavement, is effected simultaneously with the proportional plus derivative control. This additional setpoint pressure request constitutes an intervention in the braking activation operation, and, as it were, is superimposed on the control of the wheel slip. The setpoint pressure request can also be made dependent on further operating variables or measured values. Changes to said request may take place constantly or inconstantly.

The value $M_{inst.}$ is preferably determined from the torque balance at the wheel. A brake torque $M_{brake}$ caused by the brake, the wheel acceleration values ω and the wheel inertia values Θ are included in the equation. The torque applied by the drive and its proportional inertia can also be included. In the simplest case, the equation is as follows:

$$M_{inst.} = -M_{brake} + \dot{\omega} \cdot \Theta \quad \text{(I)}$$

The value $M_{inst.}$ which is calculated in this way can be assigned a corresponding application force or brake pressure which brings about a brake torque which is precisely opposed to the value $M_{inst.}$. If it were possible to set this pressure without a time delay and in an infinitely precise way, the wheel would remain in its state without further changes in rotational speed.

This application force is used here to supplement the brake control in that the otherwise customary integral component of the control is directly replaced by it, or an additional setpoint pressure request is calculated with it as an equivalent value instead of an integral component.

The method which is to be used to carry out corrections to this additional setpoint pressure request can in particular also be made dependent on the control error and on comparisons between the instantaneous torque $M_{inst.}$ and the brake torque requests by the control at this time.

An explanation is now given of two variants of the method according to the invention which are particularly suitable for adjusting a tire, especially beyond the adhesion maximum, to a specific setpoint slip value $s_{setp}$, it being basically possible for $s_{setp}$ to lie between zero and one corresponding to 0% and 100%. The first method steps of the two variants do not differ.

The control error Δ is determined by forming the difference between the wheel speed $v_{wheel}$ and its setpoint value:

$$\Delta = [(1 - s_{setp}) * v_{vehicle}] - v_{wheel} \quad \text{(II)}$$

A proportional plus derivative controller, known as PD controller for short, which calculates a controller setpoint pressure $P_{controller}$ which is calculated from the sum of the proportional component $P_{proportional}$ and derivative component $P_{derivative}$, acts on this control error in both cases:

$$P_{controller} = P_{derivative} + P_{proportional} \quad \text{(III)}$$

It is assumed that the brake torque $M_{brake}$ and the brake pressure p (or the corresponding application force of the brake) are related by a proportionality factor k:

$$M_{brake} = p * k \text{ (where } p \geq 0 \text{ and } k < 0\text{)} \quad \text{(IV)}$$

In this way, a pressure $p_{inst.}$ is calculated which would maintain the instantaneous slip state, i.e. would lead to a disappearing wheel speed derivative, based on the equation (I):

$$P_{inst.} = \frac{1}{k} \cdot M_{inst.} = \frac{1}{k} \cdot (-M_{brake} + \dot{\omega} \cdot \Theta) \quad \text{(V)}$$

$p_{inst.}$ is expediently filtered since the values of the wheel speed derivatives are subject to noise.

The two variants A) and B) of the control method then differ.

A) In a first, simpler variant of the brake control method, the setpoint pressure $p_{setp}$ which is to be set at the brake is determined as a sum of $p_{inst.}$ and a predefined controller value $p_{controller}$:

$$p_{setp} = p_{inst.} + p_{controller} \quad \text{(VI)}$$

The instantaneous value of the pressure $p_{inst.}$ is approximately determined or estimated here continuously.

Figure 4:
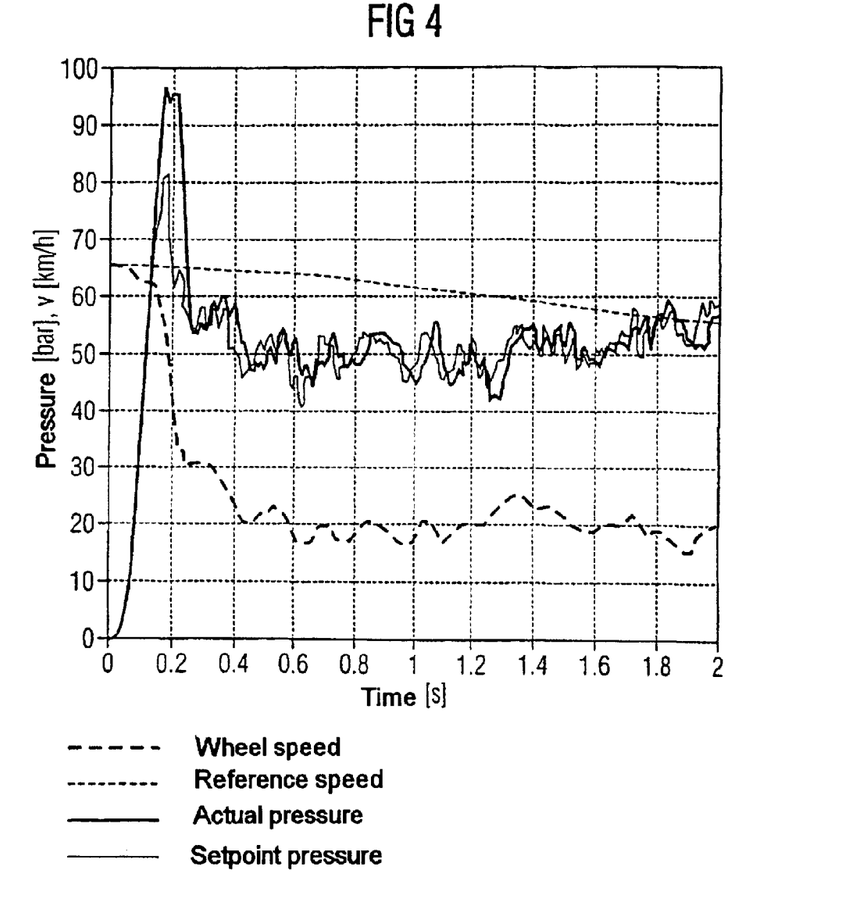
FIG. 4 shows measurement results of a first variant of the control method according to the invention.

The measurement result of this variant A) is apparent from FIG. 4 in which the time profile of the wheel speed, the reference speed of the motor vehicle G, the actual brake pressure and the setpoint brake pressure are represented.

B) In a second variant of the brake control method, a correction pressure $p_{correction}$ is set or adjusted in an integral fashion in predefined driving situations. For this purpose, when a slip threshold (for example 10%) is exceeded, a starting value for the correction pressure $p_{correction\_start}$ is defined by making $P_{correction\_start}$ equivalent to $p_{inst}$ at this instant. As a result, an appropriate starting value is quickly defined:

$$p_{correction\_start} = p_{inst.} \quad \text{(VII)}$$

Then, the value is adjusted in an integral fashion if predefined conditions are fulfilled. The value is to be increased (or reduced) only if the wheel rotates too quickly (or too slowly) by a minimum amount $\Delta_{min}$ and the current pressure setpoint value would not be sufficient to slow the wheel (or to accelerate it) unless the (only attenuating) derivative component is taken into account. The conditions suitable for this are given below in a mathematical representation. The integral which is produced is weighted with a selectable factor $K_1$:

$$p_{correction} = p_{correction\_start} + K_1 \cdot \int [p_{inst.} - (p_{correction} + p_{proportional})] \cdot dt \quad \text{(VIII)}$$

the integration being continued only under the condition that:

$$\Delta > +\Delta_{min} \& p_{inst.} - (p_{correction} + p_{proportional}) \leq 0$$

or:

$$\Delta < -\Delta_{min} \& p_{inst.} - (p_{correction} + p_{proportional}) \geq 0$$

(where the following applies: $\Delta_{min} > 0$)

Most of the time $p_{correction}$ is therefore kept constant when the method is functioning according to the invention.

The setpoint pressure is then:

$$p_{setp} = p_{correction} + p_{controller} \quad \text{(IX)}$$

The instantaneous value of the pressure $p_{inst.}$ is approximately determined or estimated here as a function of the situation.

Figure 5:
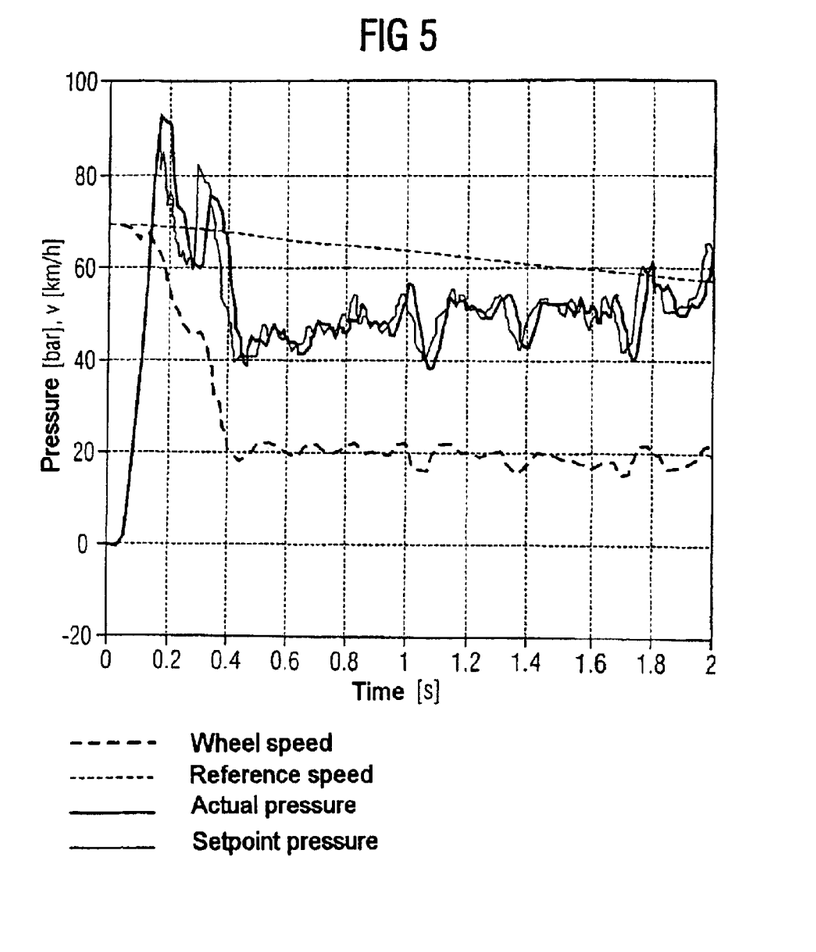
FIG. 5 shows measurement results of a second variant of the control method according to the invention.

The measurement results of this variant B) are apparent from FIG. 5 in which the time profile of the wheel speed, the reference speed, the actual brake pressure and the setpoint brake pressure are also illustrated.

Note: the derivative component is set to the same values in the method variants A) and B). The proportional component which is selected is somewhat smaller in variant A) than in variant B) as here the increase in the frictional value curve is already compensated by the feeding back of the instantaneously transmitted torques, i.e. the friction value curve is simultaneously "measured" and included in the setpoint pressure.

In conclusion, it is possible to state that the invention constitutes a brake system with intervention means, which operates in parallel with a controller which is known per se, for example a proportional plus derivative controller, in order to carry out effective wheel slip control. On the one hand it is novel that such a method is used for wheel slip control and, on the other hand, that suitable values for the intervention are determined from the torque balance on the wheel.

Figure 6:
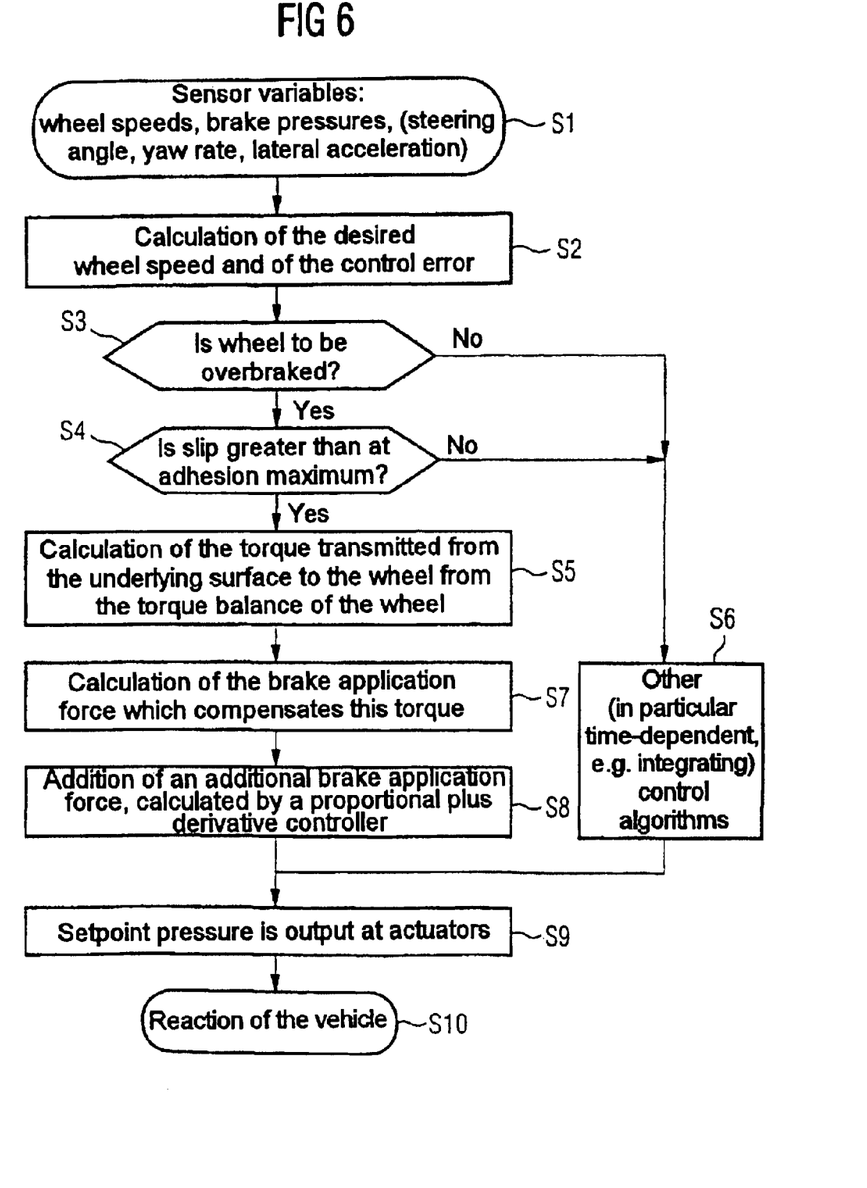
FIG. 6 shows a flowchart of a program processed by the control system of the brake system according to FIG. 1.

The flowchart which is shown in FIG. 6 of a program which is executed by the control system 8 of the brake system 1 has the following program steps:

S1: the following sensor variables are evaluated in the control system 8: wheel speeds and brake pressures, if appropriate also steering angles, yaw rate and lateral acceleration.

S2: The desired wheel speed and the control error are calculated.

S3: An interrogation is carried out to determine whether the wheel is to be overbraked If the result is "yes", step S4 follows, and if the result is "no", a jump to step S6 follows.

S4: An interrogation is carried out to determine whether the slip is greater than the adhesion maximum. If the result is "yes", step S5 follows, and if the result is "no" a jump to step S6 follows.

S5: The torque which is transmitted from the underlying surface to the wheel is calculated from the torque balance on the wheel.

S6: At deviating control algorithm, in particular a time-dependent, for example an integrating, control algorithm, is executed (explanation of this after the end of the program). This is followed by a jump to step S9.

S7: A brake application force (activation force) which compensates the torque transmitted from the underlying surface to the wheel is calculated.

S8: An additional brake application force, which has been determined by the proportional plus derivative controller 21 is added to this brake application force.

S9: The setpoint pressure values which result for the individual wheels from this are output to the associated wheel brake actuators.

S10: The reaction of the motor vehicle then takes place.

The deviating control algorithm mentioned in step S6 may be a conventional ABS algorithm if the wheel is not to be overbraked. If, on the other hand, the wheel is to be overbraked, but is however not yet or no longer being actually overbraked, the control algorithm brings about a situation in S6 in which the setpoint pressure is suddenly increased in such a way that the wheel is overbraked as desired. The increase in the setpoint pressure is calculated, for example, as a function of the time which has passed or of the observed wheel behavior. Known brake algorithms and ABS algorithms are generally time-dependence, whereas the method according to the invention also functions without a time dependence in the overbraking phase.

A program run is thus terminated. The program is continuously executed again at every braking operation and every vehicle dynamics control operation. Said program results in optimized braking effects under different conditions of the road pavement and, if necessary, effectively prevents the motor vehicle from swerving or skidding in critical driving situations.

What is claimed is:

1. A method for controlling a braking process in a motor vehicle, which comprises:
   converting brake actuation signals into brake application forces;
   transmitting wheel speeds of at least some of the wheels of the motor vehicle to a control system;
   calculating a wheel slip from the wheel speeds, and setting a predefined value for the wheel slip by a proportional control and a setpoint brake pressure defined in parallel therewith; and
   setting the control to a longitudinal slip above a maximum of a coefficient of static friction, to thereby reduce a lateral guiding force of the wheel and to thereby stabilize a driving behavior of the motor vehicle.

2. The method according to claim 1, which comprises setting the predefined value for the wheel slip by way of a proportional plus derivative control.

3. The method according to claim 1, which comprises setting the predefined value for the wheel slip by way of a proportional integral control with a relatively very small integral component.

4. The method according to claim 1, which comprises determining the setpoint brake pressure by way of a wheel torque instantaneously transmitted from the wheel to an underlying surface.

5. The method according to claim 1, which comprises determining a wheel torque instantaneously transmitted from the wheel to an underlying surface from a torque balance at the wheel.

6. The method according to claim 1, which comprises determining a wheel torque instantaneously transmitted from the wheel to an underlying surface according to an equation $M_{inst.} = -M_{brake} + \omega \cdot \Theta$, wherein $M_{brake}$ is a brake torque caused by the brake, ω represents wheel acceleration values, and Θ represents wheel inertia values, and calculating the defined setpoint brake pressure with which intervention into the brake control system is carried out using a wheel brake pressure corresponding to the instantaneously transmitted wheel torque.

7. A brake system with control of the braking process in a motor vehicle, comprising:
   wheel speed sensors for sensing respective speeds of the wheels of the motor vehicle and generating sensor signals representing wheel speeds;
   a control system configured to receive the sensor signals, to evaluate the sensor signals, and to calculate values for a wheel slip of individual wheels;
   said control system including a proportional controller and setting a predefined value for the wheel slip by a proportional control and a setpoint brake pressure defined in parallel therewith;
   said control system performing an adjustment in generating control signals for the wheel brakes, said control system determining a setpoint brake pressure and using the setpoint brake pressure, in addition to the adjustment, to set a brake pressure at the wheel brakes for braking the wheels; and
   brake actuators connected to receive the control signals and to activate the wheel brakes in accordance therewith.

8. The system according to claim 7, wherein said control system is configured to set the control to a longitudinal slip lying above a maximum of a coefficient of static friction and to thereby reduce a lateral guiding force of the wheel and stabilize a driving behavior of the motor vehicle.

9. The brake system according to claim 7, wherein said control system is configured to determine the setpoint brake pressure by way of the wheel torque instantaneously transmitted from the respective wheel to an underlying surface.

10. The brake system according to claim 7, wherein said control system is configured to determine the wheel torque instantaneously transmitted from the respective wheel to a underlying surface from a torque balance at the wheel.

11. A method for controlling a braking process in a motor vehicle, which comprises the steps of:

converting brake actuation signals into brake application forces;
transmitting signals representing wheel speeds of at least some of the wheels to a control system;
calculating a wheel slip by the control system from the wheel speeds; and
setting a predefined value for a wheel slip by a proportional control and a setpoint brake pressure defined in parallel therewith.

12. The method according to claim 11, wherein the predefined value for the wheel slip is set by means of a proportional plus derivative control.

13. The method according to claim 11, wherein the predefined value for the wheel slip is set by means of a proportional integral control with a very small integral component.

14. The method according to claim 10, wherein the setpoint brake pressure is determined by means of the wheel torque which is transmitted from the wheel to the underlying surface instantaneously.

15. The method according to claim 10, wherein the wheel torque which is transmitted from the wheel to the underlying surface instantaneously is determined from the torque balance at the wheel.

16. The method according to claim 10, wherein the wheel torque which is transmitted from the wheel to the underlying surface instantaneously is determined according to the equation $M_{inst}=-M_{brake}+\omega\cdot\Theta$ wherein $M_{brake}$ is the brake torque caused by the brake, ω is the wheel acceleration values and Θ is the wheel inertia values, and in that the defined setpoint brake pressure with which intervention into the brake control system is carried out is calculated using a wheel brake pressure which corresponds to this transmitted wheel torque.

17. The method according to claim 10, wherein, by setting the control to a longitudinal slip above the maximum of the coefficient of static friction, the lateral guiding force of the wheel is reduced, and the driving behavior of the motor vehicle is thus stabilized.

* * * * *